(12) United States Patent
Honzek et al.

(10) Patent No.: US 7,467,679 B2
(45) Date of Patent: Dec. 23, 2008

(54) RADIATOR MODULE FOR COMMERCIAL MOTOR VEHICLES

(75) Inventors: Robert Honzek, Oberthingau (DE); Gerhard Mariner, Bidingen (DE); Guido Naegele, Marktoberdorf (DE); Gerd Rathke, Marktoberdorf (DE); Georg Schwarz, Biessenhofen (DE); Juergen Tschullik, Ingolstadt (DE)

(73) Assignee: AGCO GmbH (DE)

( * ) Notice: Subject to any disclaimer, the term of this patent is extended or adjusted under 35 U.S.C. 154(b) by 409 days.

(21) Appl. No.: 11/472,487

(22) Filed: Jun. 21, 2006

(65) Prior Publication Data
US 2007/0000705 A1 Jan. 4, 2007

(30) Foreign Application Priority Data
Jun. 21, 2005 (GB) .................................. 0512587.7

(51) Int. Cl.
*F28B 9/10* (2006.01)
(52) U.S. Cl. .................... 180/68.4; 180/68.6; 180/68.2; 180/68.1; 165/42
(58) Field of Classification Search ................ 180/68.4, 180/68.6, 68.2, 68.1; 165/42
See application file for complete search history.

(56) References Cited

U.S. PATENT DOCUMENTS 3,989,103 A * 11/1976 Cieszko et al. .............. 165/110
6,648,088 B2 * 11/2003 Gabioli ....................... 180/68.4
7,255,189 B2 * 8/2007 Kurtz et al. ................. 180/68.4
7,261,173 B2 * 8/2007 Kurtz et al. ................. 180/69.2

* cited by examiner

*Primary Examiner*—Christopher Ellis
*Assistant Examiner*—Cynthia F. Collado
(74) *Attorney, Agent, or Firm*—Ryan A. Schneider, Esq.; Troutman Sanders LLP

(57) ABSTRACT

A radiator module for commercial motor vehicles, in particular for agricultural tractors, has a support plate fixed to the chassis and at least one coolant radiator fixed to the support plate. The radiator has a radiator block and two coolant tanks oriented at opposite ends of the block with one tank adjacent the support plate and one spaced away form the support plate. In order to increase the cooling performance of the radiator module despite keeping the installation space above the support plate constant it is proposed that the coolant tank near the plate is constructed from two mutually complementing tank parts. The first tank part is assigned to the radiator block and has an encircling flange for pressure sealed attachment of the coolant radiator on the support plate. A second tank part is assigned to the support plate. By dividing the coolant tank into two parts, one on the radiator block and one on the support plate the effective heat sink area of the coolant radiator can be substantially increased. On the one hand the enlargement is due to the fact that the flange encircling the first tank part also serves to attach the coolant radiator on the support plate and in this region an assembly gap is therefore left between these components. On the other hand the enlargement is due to the fact that by moving part of the coolant tank under the surface of the support plate, the overall height of the coolant radiator is increased accordingly.

6 Claims, 6 Drawing Sheets

RADIATOR MODULE FOR COMMERCIAL MOTOR VEHICLES

This application is based on, and claims priority to, UK Application No. GB0512587.7, filed Jun. 21, 2005.

BACKGROUND OF THE INVENTION

The invention relates to a radiator module for commercial motor vehicles, in particular for agricultural tractors, which comprises a support plate fixed to the chassis and at least one coolant radiator fixed to the support plate, the radiator consisting of a radiator block and two coolant tanks oriented one at each end of the block, the radiator being supported on the plate by one of the coolant tanks.

A radiator module of this kind is known for agricultural tractors (our product), in which the support plate is implemented as a welded part and is mounted in the front axle region of the tractor directly in front of the engine in an approximately horizontal plane on laterally spaced side members, which form the chassis. A transmission casing, via which a front power take-off shaft can be driven at a variable speed of revolution is accommodated between the side members. For space reasons the transmission casing extends relatively far upwards, so that having regard to unhindered assembly of the components a certain distance must be provided between the transmission casing and the support plate. The coolant radiators of tubular/fin construction are fixed on the support plate located one behind the other, at least one coolant radiator being aligned so that one of its coolant tanks comes to lie at the bottom near the plate. A certain distance required for assembly reasons is also provided here between the support plate and the coolant tank near the plate.

Because of the demand for a good view from the driver's seat of implements attached to the front of the vehicle on the one hand and the desire for better manoeuvrability of the vehicle by way of a tight turning circle on the other hand, the region of the vehicle in which the radiator module is installed has to be kept as narrow and as low as possible. The radiator module is therefore as regards its width and height dimensions subject to substantial limitations. A number of coolant radiators, such as water coolers, intercoolers, transmission oil coolers, hydraulic oil coolers and possible condensers for air conditioning systems must be accommodated within this limited heat sink area. With the present tendency to constantly increase the horse-power of engines for agricultural tractors without being able to extend the heat sink area available for cooling accordingly, dissipation of the resultant waste heat is increasingly causing difficulties.

It is an object of the invention to create a radiator module of the type described at the beginning, which enables the radiator block of a coolant radiator to be enlarged in the given installation space.

BRIEF SUMMARY OF THE INVENTION

The object is achieved in that the coolant tank near the plate consists of two mutually complementing tank parts, a first tank part is assigned to the radiator block and a second tank part assigned to the support plate, the first tank part has an encircling flange for pressure sealed attachment of the coolant radiator to the support plate.

By dividing the coolant tank into two parts, one on the radiator block and one on the support plate, it is possible to substantially increase the effective heat sink area of the coolant radiator. On the one hand the enlargement is due to the fact that the flange encircling the first tank part also serves to attach the coolant radiator on the support plate and therefore in this region an assembly gap is left between these components. On the other hand the enlargement is due to the fact that because part of the coolant tank is moved under the surface of the support plate the overall height of the coolant radiator can be increased accordingly. With constant overall height of the coolant tank, which is specified by the radiator manufacturer, this leads to a greater height of the radiator block and therefore an increase in the heat sink. The extent to which the support plate can accommodate part of the coolant tank and the heat sink area can be increased as a result of this through the invention, thus substantially depends upon the arrangement and situation of the transmission casing located under the support plate. For example, it may happen that the coolant radiator assumes a position in which sufficient space underneath the support plate is not available for the coolant tank to be accommodated in the support plate over the entire width of the coolant radiator. In this case it is possible to adapt the coolant tank within the critical region to the contour of the component located under the support plate without impairing the efficiency of the coolant tank. With conventionally oriented coolant radiators such encroachment is not possible.

A particularly technically simple arrangement of the invention is provided if the second tank part is an integrated component of the support plate, in particular cast or otherwise formed as one piece with the support plate.

A pipe to supply and/or drain the coolant flowing into the second tank part may be provided as an integral part of the support plate. This provides a radiator module having a simple pipe system which can be supplied to the assembly line completely pre-fabricated. On the assembly line only the continuing coolant pipes have to be attached to the support plate. In this arrangement it is expedient if the support plate is a casting, which can be adapted without special effort to the contour of the transmission casing located under the support plate.

BRIEF DESCRIPTION OF THE DRAWINGS

An embodiment of the invention will now be described, by way of example only, with reference to the accompanying drawings in which:—

DETAILED DESCRIPTION OF THE INVENTION

Figure 1:
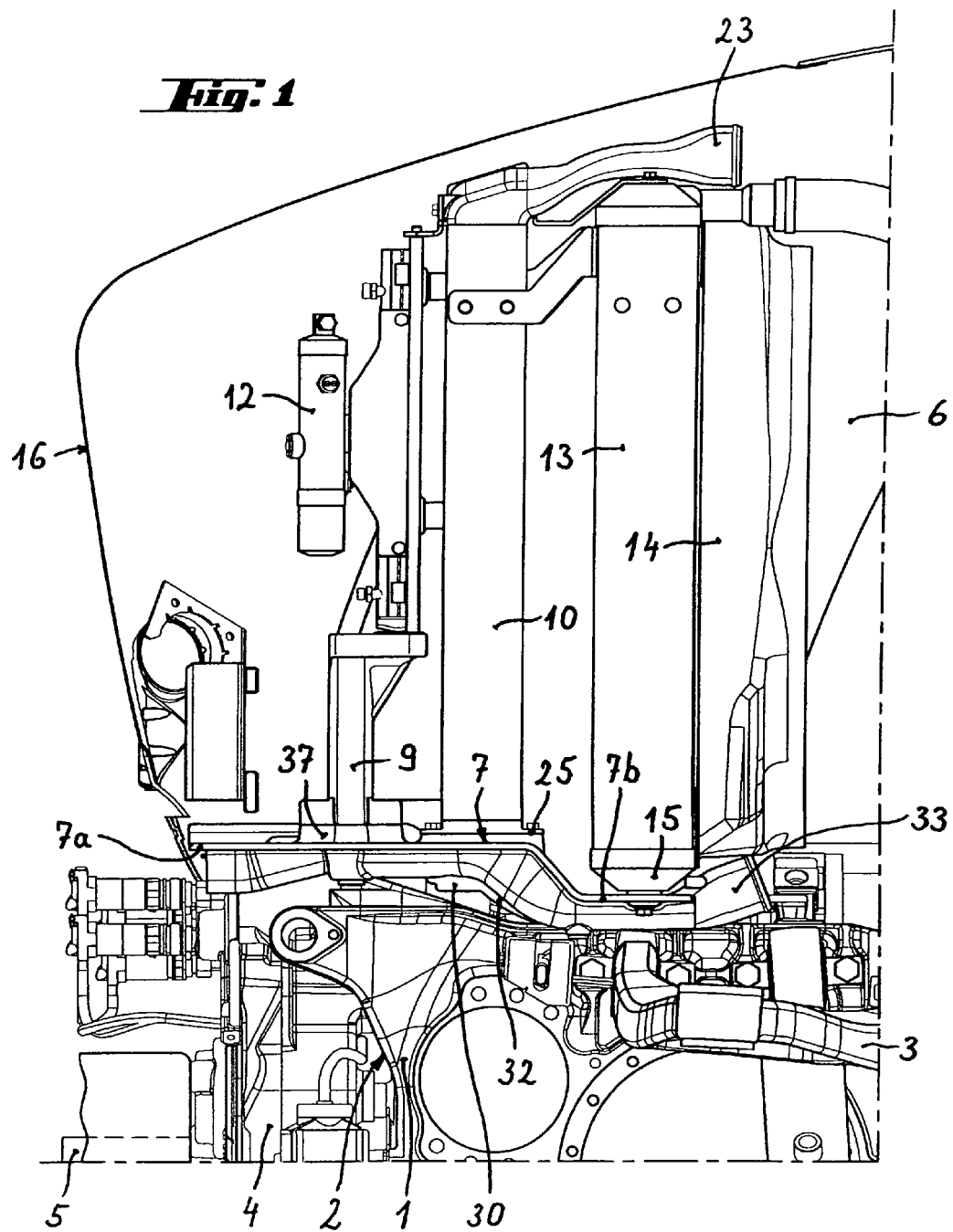
FIG. 1 is a side view of the front region of an agricultural tractor with the radiator module.

As is evident from FIG. 1, two laterally spaced side members 1, which are part of a front axle housing 2 extend fore and aft and are oriented substantially parallel to each other to form the chassis at the front end of an agricultural tractor. Only one of these side members 1 is visible in FIG. 1. An upper wishbone of a wheel suspension indicated with the reference numeral 3, which is linked to the side members 1, is also shown. In the front region of the front axle housing 2 a transmission casing 4, in which a variable transmission for driving a front power take-off shaft 5 is accommodated, is arranged between the side members 1. The rear part of the transmission casing 4 has its highest point roughly in the centre between the side members 1, which drops away towards the side members 1.

Likewise in the front area of the front axle housing 2 a radiator module 6 sits on the side members 1. The radiator module 6 consists of a support plate 7 as well as several coolant radiators fixed to the support plate 7. The support plate 7 at several places 8 is resiliently mounted on the side members 1 and secured thereto by means of bolts. The support plate 7 has two areas 7a and 7b at different heights. The area 7a is located at the front and runs closely above the transmission casing 4 whilst maintaining a narrow space therefrom, which permits unhindered assembly of the radiator module 6. Area 7a in this case lies higher than the rear area 7b.

An hydraulic oil cooler 9, an intercooler 10 and a transmission oil cooler 11 are installed as coolant radiators in the front area 7a, the intercooler 10 and the transmission oil cooler 11 being arranged next to each other and behind the hydraulic oil cooler 9. Furthermore a condenser 12 for the vehicle's air conditioning system is arranged in front of the intercooler 10. The condenser 12 is mounted on the hydraulic oil cooler 9 and on the intercooler 10. A water cooler 13 with a directly fitted cooling air fan 14 is housed in the rear area 7b. This latter radiator is installed in the conventional manner with its lower coolant tank 15 on the support plate 7. The rear area 7b is therefore lower by the height of the lower coolant tank 15 compared to the front area 7a, so that the lower coolant tank ends at the height of the area 7a and the air sucked in by the cooling air fan 14 via the coolant radiators 9 to 11 located in front of the water cooler 13 can enter the radiator block of the water cooler 13 substantially without any detour involving heavy losses. All the coolant radiators and the engine (not illustrated but positioned behind the radiator module 6 on the side members 1), are closely surrounded by a bonnet 16.

Figure 2:
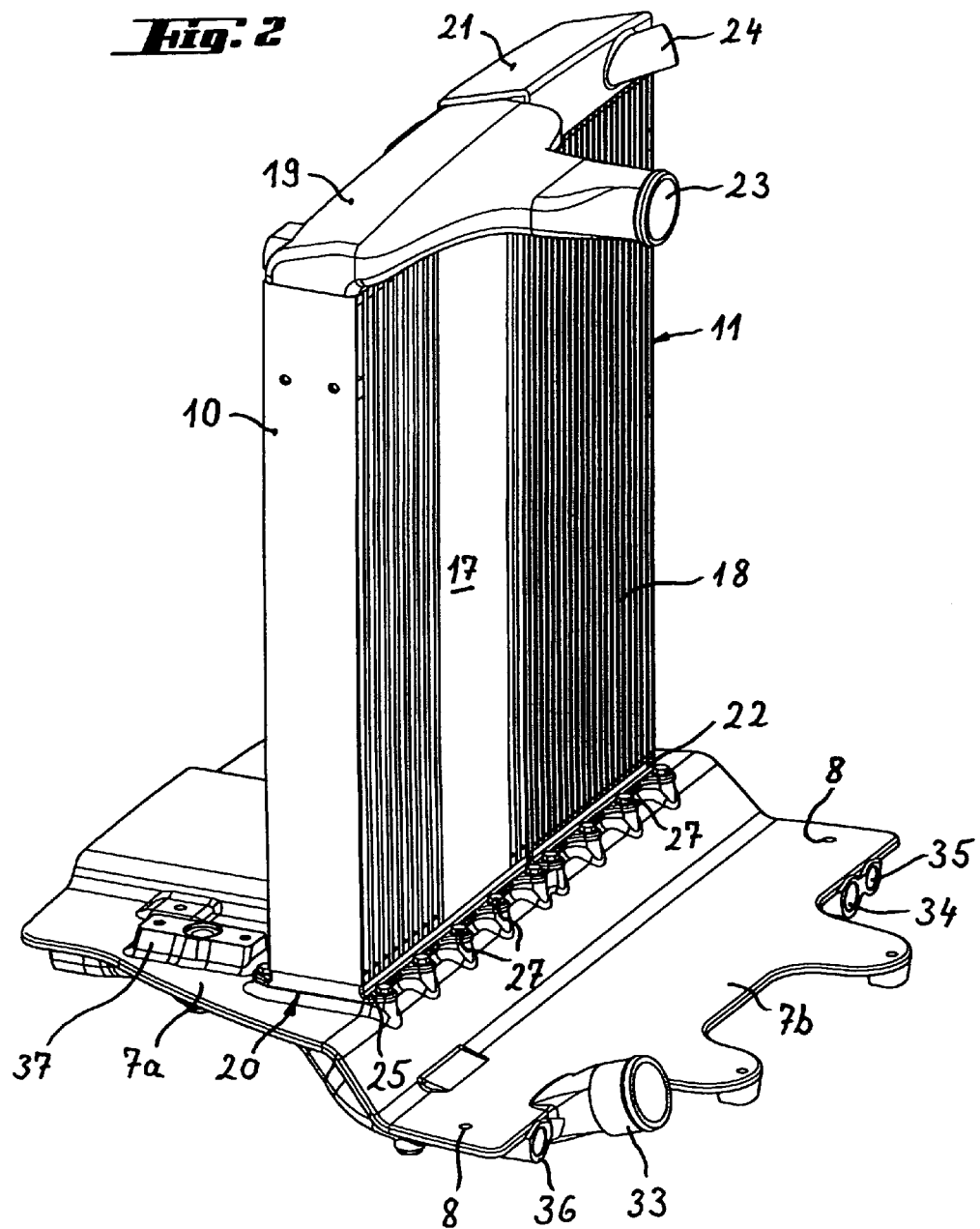
FIG. 2 is a three-dimensional view of the radiator module from above.

From FIG. 2 the fundamental structure of the intercooler 10 and the transmission oil cooler 11 can be seen. Both coolant radiators have a radiator block 17 and/or 18 of known tubular/fin construction with coolant tanks 19, 20 and/or 21, 22 in each case located at the top and bottom. The upper coolant tanks 19, 21 are constructed in the conventional manner and each have an inlet or outlet nozzle 23 and/or 24 for the coolant. The lower coolant tanks 20,22 near the support plate 7 are constructed according to the invention and differ from the above coolant tanks as described below. Since both lower coolant tanks 20, 22 are constructed in the same manner, the description is limited to that relating to the lower coolant tank 20 for the intercooler 10. It is however expressly pointed out here that lower-lying coolant tanks also of the other coolant radiators can be constructed in the same way.

Figure 3:
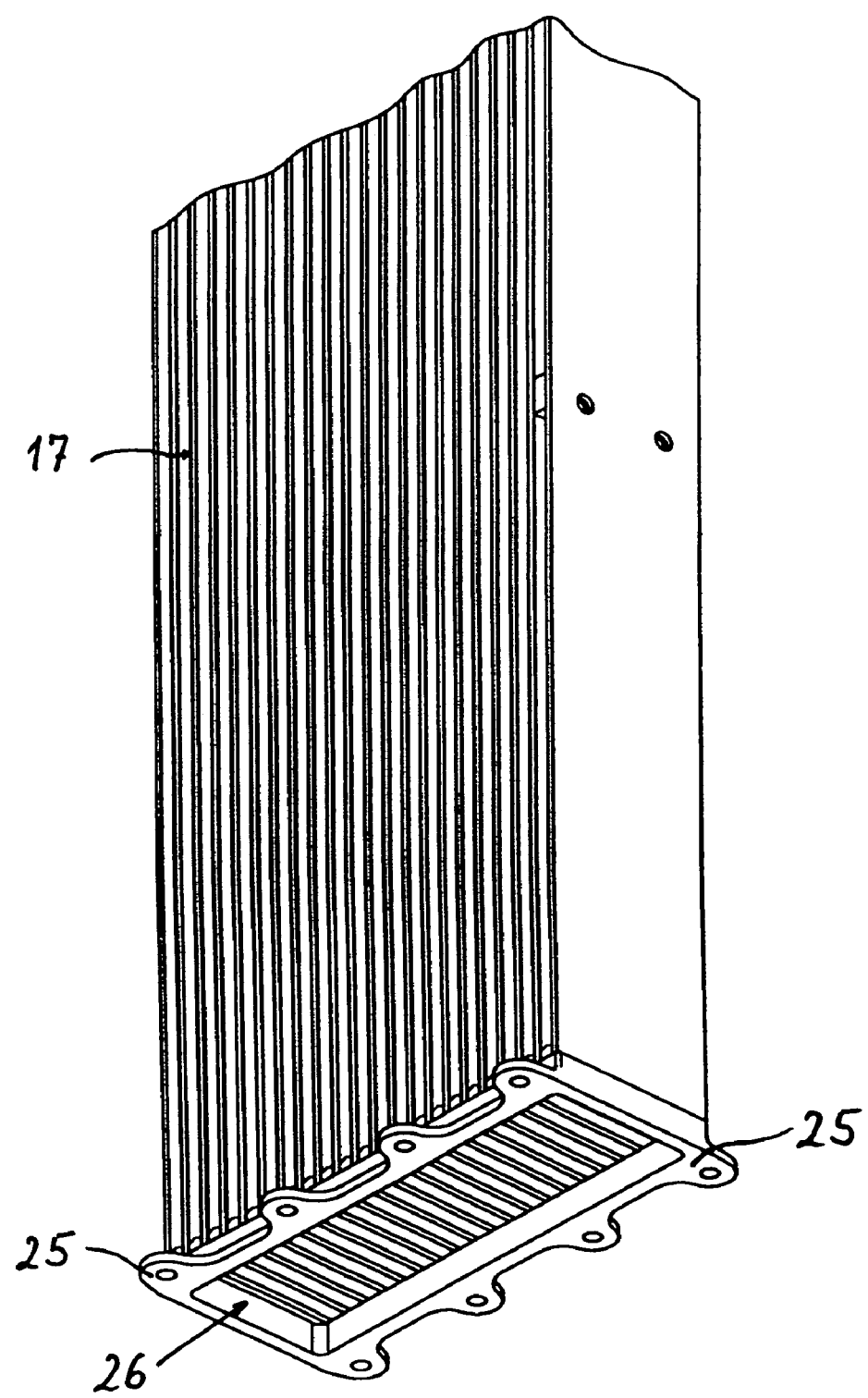
FIG. 3 is a three-dimensional view of part of a coolant radiator from below.

As is clear from FIG. 3, the radiator block 17 of the intercooler 10 in the outer region of its lower end is provided with a welded flange 25, which delimits a first tank part 26 of the lower coolant tank 20 assigned to the intercooler 10. The flange 25 possesses a number of bores, which enable the flange 25 to be fastened by means of bolts 27 to the support plate 7. For this purpose an even counter face 7c, which corresponds in shape and size to the contact surface of the flange 25, is formed on the surface of the support plate 7. By use of sealing tape or a suitable gasket a pressure sealed attachment of the intercooler 10 to the support plate 7 is obtained. The minimum possible vertical extension of the first tank part 26 is selected, so that the radiator block 17 comes very close to the counter face 7c and the effective heat sink area of the cooler block 17 becomes as large as possible whilst the height of the upper coolant tank 19 remains the same.

Figure 4:
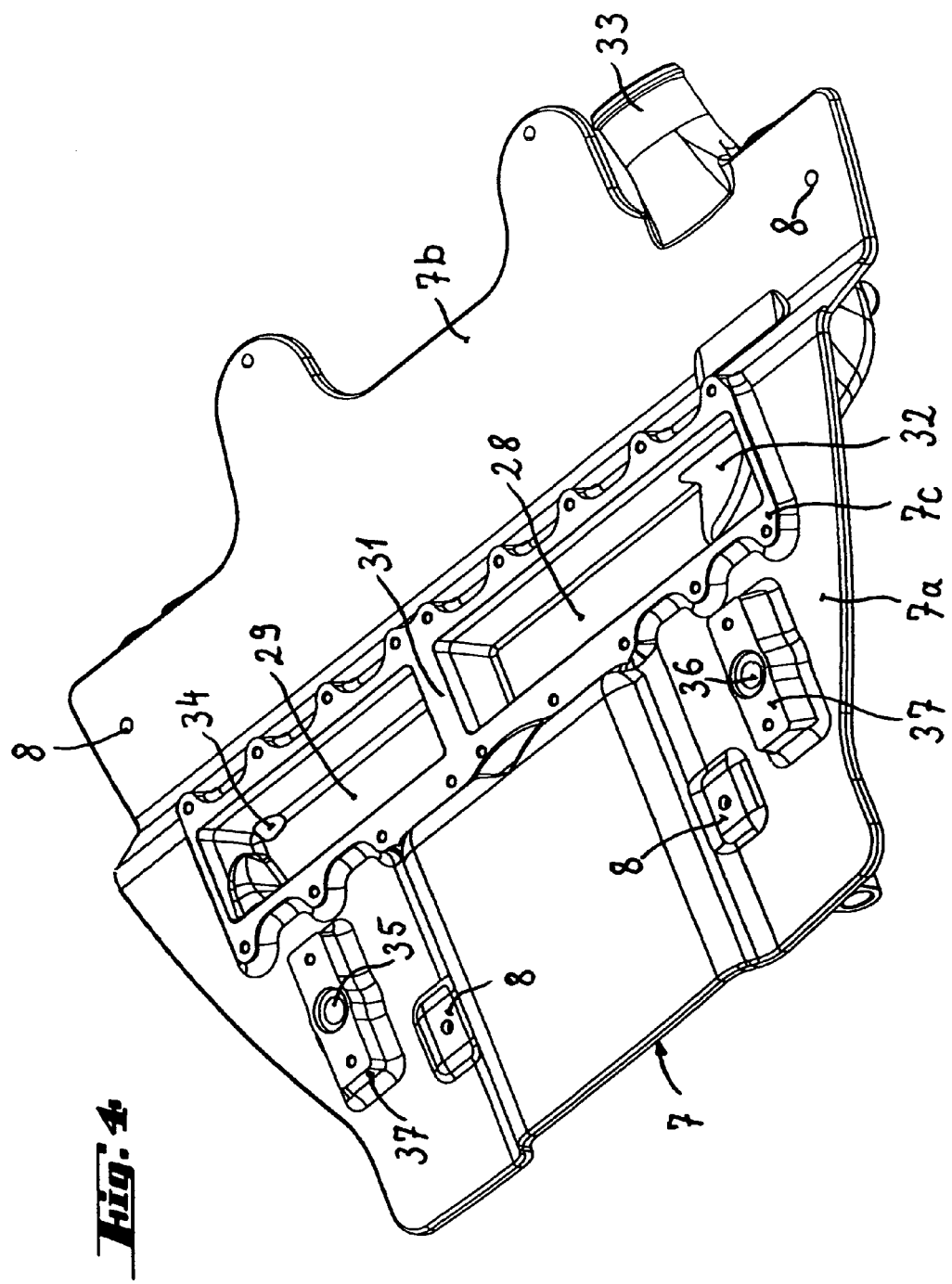
FIG. 4 is a three-dimensional view of the support plate without the coolant radiator from above.

Since such a small height of the first tank part 26 is insufficient to ensure normal distribution of the coolant over the entire surface of the cooler block 17, according to FIG. 4 a region within the counter face 7c on the support plate 7 is provided with a recess, which forms a second tank part 28. First and second tank part 26 and 28 complement one another to form the fully-fledged lower coolant tank 20, whose height corresponds to that of the upper coolant tank 19. In the same way a second tank part 29 of the lower coolant tank 22 is formed in the support plate 7 for the transmission oil cooler 11, both tank parts 20, 22 lying in a common pan 30 and only being separated from one another by a wall 31.

Figure 5:
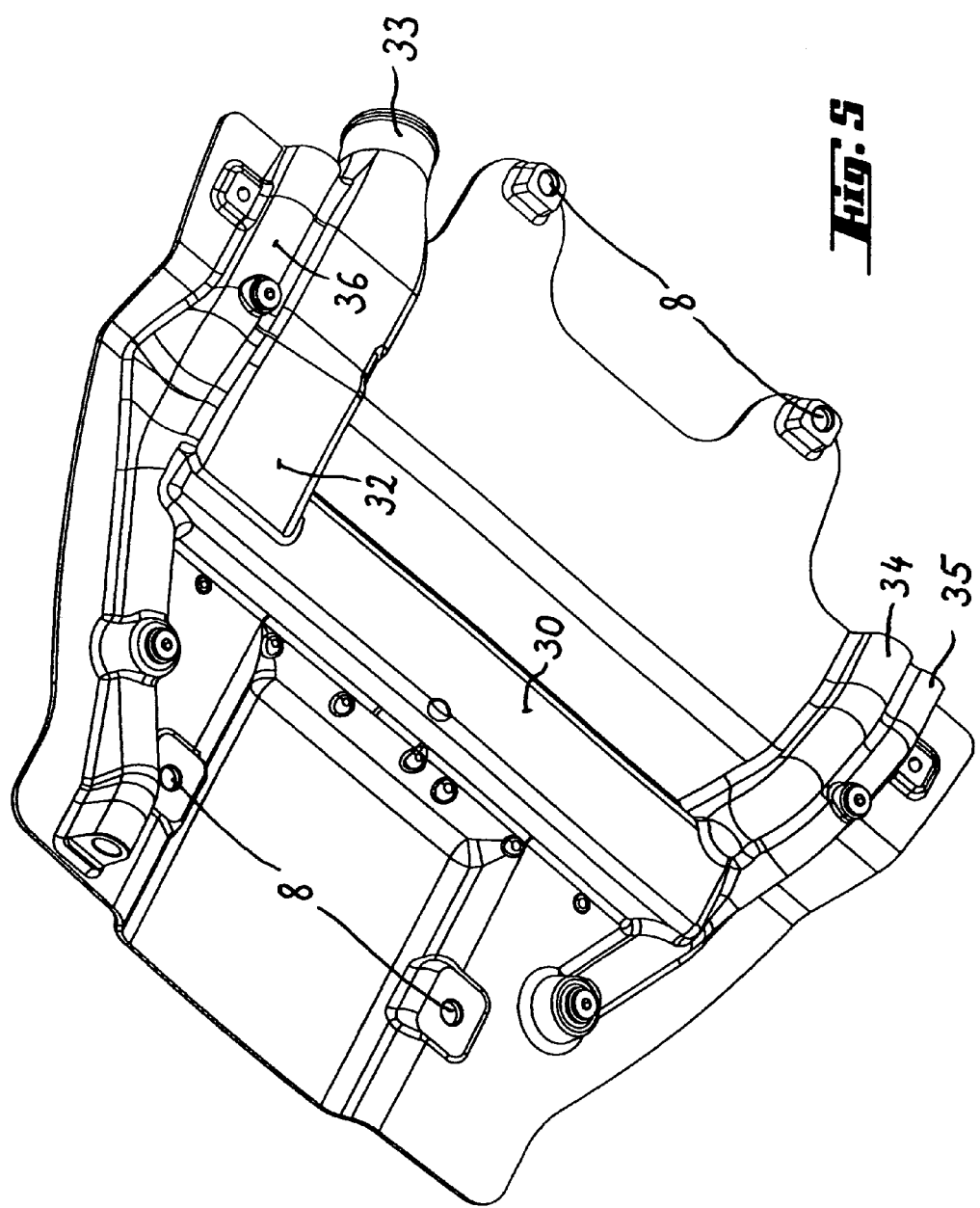
FIG. 5 is a three-dimensional view of the support plate from below and FIG. 6 is a view of the support plate according to FIG. 5 from below.
Figure 6:
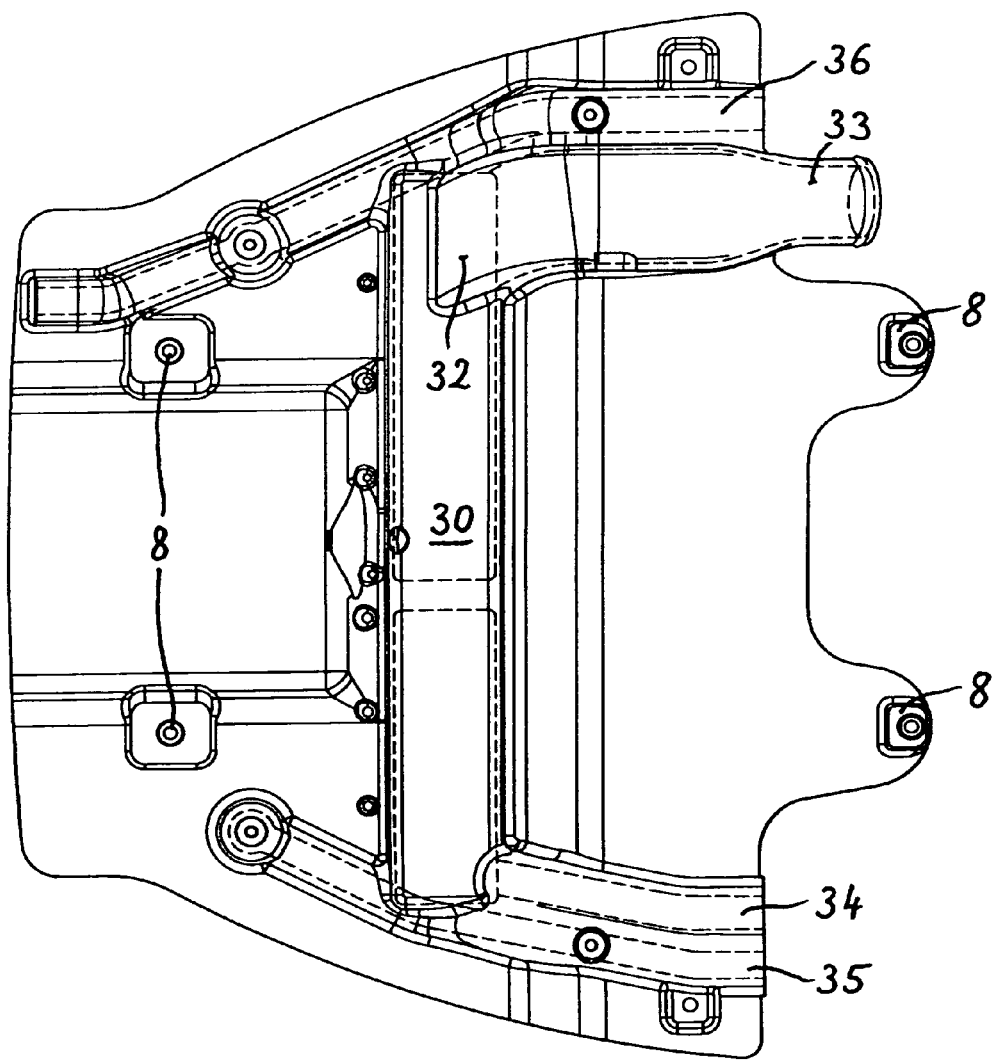

A pipe 32, is integrated in the support plate 7 which is formed as a casting. Pipe 32 has an inlet/outlet connecting piece 33 which is formed at the rear of the support plate 7. The path of pipe 32 as it flows into the second tank part 28, can be seen from FIG. 5 and FIG. 6 and is selected having regard to vehicle components located under the support plate 7. From the latter figures it is also clear that apart from the water cooler 13 and the condenser 12, which are supplied with coolant in the usual way, all other coolant radiators 9 to 11 are attached to pipes, which likewise are integrated into the support plate 7. Thus a corresponding pipe 34 leads to the second tank part 29 of the transmission oil cooler 11. Two further pipes 35, 36 lead to the places 37 at which the hydraulic oil cooler 9 (which has laterally spaced cooler tanks) is fixed to the support plate 7 and is connected to the pipes 35, 36 in a pressure sealed manner.

The invention claimed is:

1. Radiator module for commercial motor vehicles, in particular for agricultural tractors, which comprises a support plate (7) fixed to the chassis and at least one coolant radiator (10) fixed to the support plate, the radiator consisting of a radiator block (17) and two coolant tanks (19, 20) oriented at opposite ends of the block with one tank adjacent the support plate, and the other space away from the support plate, wherein the coolant tank (20) near the plate (7) consists of two mutually complementing tank parts (26, 28), a first tank part (26) is assigned to the radiator block (17) and a second tank part (28) assigned to the support plate (7) the first tank having an encircling flange (25) for pressure sealed attachment of the coolant radiator (10) to the support plate (7).

2. Radiator module according to claim 1, wherein the second tank part (28) is an integrated component of the support plate (7).

3. Radiator modules according to claim 2, wherein the second tank part (28) is formed as one piece with the support plate (7).

4. Radiator module according to claim 3, wherein a pipe (32) integrated in the support plate (7) flows into the second tank part (28) in order to supply and/or drain the coolant therefrom.

5. A radiator module according to claim 4 wherein the support plate (7) includes one or more other pipes (34,35,36) for the supply and/or draining of coolant from one or more other cooling devices (11,9) mounted on the support plate.

6. Radiator module for commercial motor vehicles according to claim 1 wherein the support plate (7) is a casting.

* * * * *